United States Patent [19]

Kroker et al.

[11] 4,190,569

[45] Feb. 26, 1980

[54] BAKING FINISHES OF LOW SOLVENT CONTENT

[75] Inventors: Ruprecht Kroker, Bobenheim-Roxheim; Hans Sander, Ludwigshafen; Hermann Gausepohl, Mutterstadt; all of Fed. Rep. of Germany

[73] Assignee: BASF Aktiengesellschaft, Fed. Rep. of Germany

[21] Appl. No.: 939,969

[22] Filed: Sep. 6, 1978

Related U.S. Application Data

[63] Continuation of Ser. No. 820,721, Aug. 1, 1977, abandoned.

[30] Foreign Application Priority Data

Jun. 24, 1977 [DE] Fed. Rep. of Germany ....... 2728459

[51] Int. Cl.$^2$ .................................................. C08K 5/05
[52] U.S. Cl. ............................ 260/31.6; 260/32.8 EP; 260/33.2 EP; 260/33.4 EP
[58] Field of Search ................. 260/33.6 EP, 33.4 EP, 260/33.2 EP, 31.6, 32.8 EP

[56] References Cited

U.S. PATENT DOCUMENTS

3,065,195   11/1962   Vasta ............................ 260/32.8 EP
3,940,353   2/1976    Martorano ........................ 260/31.6

*Primary Examiner*—Paul R. Michl
*Attorney, Agent, or Firm*—Keil & Witherspoon

[57] ABSTRACT

The invention relates to baking finishes of low solvent content, consisting essentially of an acrylate resin, an eposy resin and a mixture of organic solvents, with or without pigment, catalyst and other conventional auxiliaries, in which the acrylate resin is a copolymer which contains from 10 to 35% by weight of $\alpha,\beta$-olefinically unsaturated carboxylic acids as copolymerized units, has a very low K value and has an acid number of from 70 to 250 mg of KOH/g, the epoxy resin contains at least 2 oxirane groups per molecule and the mixture of organic solvents is a mixture of from 20 to 80% by weight of a solvent having a boiling point of from 100° to 280° C. and a dielectric constant of from 2 to 4.99, and from 80 to 20% by weight of a solvent having a boiling point of from 80° to 200° C. and a dielectric constant of from 5 to 27. The weight ratio of acrylate resin to epoxy resin is from 9:1 to 6:4.

The acrylate resin has a mean molecular weight Mn of from 1500 to 3000 and an inhomogeneity (Mw/Mn), measured by gel permeation chromatography, of from 1.5 to 2.0.

These baking finishes of low solvent content may be used, e.g., as finishes for domestic equipment and as automotive primers.

7 Claims, No Drawings

BAKING FINISHES OF LOW SOLVENT CONTENT

This is a continuation, of application Ser. No. 820,721, filed Aug. 1, 1977 now abandoned.

The present invention relates to baking finishes of low solvent content, which essentially comprise
(A) an acrylate resin,
(B) an epoxy resin and
(C) a mixture of organic solvents,
with or without pigment, catalyst and other conventional auxiliaries, in which the acrylate resin (A) is a copolymer which contains from 10 to 35% by weight of $\alpha,\beta$-olefinically unsaturated carboxylic acids as copolymerized units, has a K value (measured by the Fikentscher method) of less than 15 and has an acid number of from 70 to 250 mg of KOH/g, the epoxy resin (B) contains at least 2 oxirane groups per molecule, and the mixture of organic solvents (C) is a mixture of from 20 to 80% by weight of a solvent having a boiling point of from 100° to 280° C. and a dielectric constant of from 2 to 4.99 and from 80 to 20% by weight of a solvent having a boiling point of from 80° to 200° C. and a dielectric constant of from 5 to 27, the weight ratio of the components (A):(B) being from 9:1 to 6:4 and the weight ratio of the components (A+B):(C) being from 7:3 to 5:5.

It is an object of the present invention to provide baking finishes of low solvent content with further improved processing characteristics and properties in use.

We have found that this object is achieved by providing baking finishes of low solvent content having the above composition, wherein the acrylate resin (A) has a mean molecular weight Mn of from 1500 to 3000 and in inhomogeneity (Mw/Mn), measured by gel permeation chromatography, of from 1.5 to 2.0.

A preferred embodiment of the invention consists in that the acrylate resin (A) is a copolymer of from 12 to 25% by weight of acrylic acid or methacrylic acid, from 5 to 70% by weight of one or more esters of acrylic acid or methacrylic acid with a monoalkanol of 1 to 8 carbon atoms, from 5 to 70% by weight of styrene and from 0 to 20% by weight of an alkanediol monoester of acrylic acid or methacrylic acid.

Particularly preferred baking finishes of the above type are those in which the acrylate resin (A) has been manufactured from the monomers at temperatures of from 170° to 280° C. and pressures of from 1.5 to 30 bars, in the presence or absence of a free-radical initiator and/or an organic solvent.

Surprisingly, the baking finishes of the invention can be processed with very low solvent contents. They can be sprayed at solids contents of more than 70% by weight, preferably of from 75 to 85% by weight, can be used on vertical surfaces, exhibit good leveling and, after baking, give coatings which have good mechanical properties and good resistance to chemicals and solvents and provide good corrosion protection.

The following is to be noted in respect of the individual components on which the baking finishes of the invention are based. (A) The acrylate resin (A) comprises from 10 to 35% by weight of $\alpha,\beta$-olefinically unsaturated carboxylic acids as copolymerized units. The mean molecular weight is from 1500 to 3000, and the inhomogeneity (Mw/Mn) measured by gel permeation chromatography is from 1.5 to 2.0 Determination of the inhomogeneity (Mw/Mn) by gel permeation chromatography is carried out by the method described in the Journal of Applied Polymer Science, vol. 19, 1975, pages 629–631, at the 5th International Seminar held by Messrs. Waters in London in 1968, and at the 6th International Seminar held by the same company in Miami Beach, Florida, in 1968.

The acid number of the acrylate resin (A) is from 70 to 250 mg of KOH/g.

Suitable $\alpha,\beta$-olefinically unsaturated carboxylic acids are dicarboxylic acids, eg. maleic acid, fumaric acid and itaconic acid, and, preferably, monocarboxylic acids, eg. acrylic acid and/or methacrylic acid, which are preferably present, as copolymerized units, in amounts of from 12 to 25% by weight.

The following comonomers can be present as copolymerized units in the copolymer (A):

(a) Esters of acrylic acid and/or methacrylic acid with linear or branched monoalkanols of 1 to 8 carbon atoms, eg. ethyl acrylate, methyl methacrylate, ethyl methacrylate, butyl methacrylate, 2-ethylhexyl acrylate and n-butyl acrylate, preferably in amounts of from 5 to 70% by weight based on the copolymer (A).

(b) Vinyl-aromatics, eg. styrene and/or vinyltoluene, preferably in amounts of from 5 to 70% by weight, based on copolymer (A), (c) Optionally, up to 20% by weight of acrylic acid monoesters and/or methacrylic acid monoesters of alkanediols of 2 to 6 carbon atoms, which alkanediols may also contain one or more oxa groups, eg. hydroxypropyl acrylate, butanediol monoacrylate, hydroxyethyl methacrylate, diethylene glycol monoacrylate and monomethacrylate and triethylene glycol monoacrylate and monomethacrylate, and (d) Optionally, minor amounts, of up to 10% by weight, of further copolymerizable monomers, eg. acrylonitrile, methacrylonitrile, acrylamide, methacrylamide, methylolacrylamide, methylolmethacrylamide, N-alkoxymethylacrylamide, N-alkoxymethylmethacrylamide, vinyl esters, eg. vinyl acetate and vinyl propionate, dialkylamaleates and dialkylfumarates, monoalkylmaleates and monoalkylfumarates, acrolein and allyl alcohol.

Examples of particularly preferred acrylate resins (A) are copolymers of from 12 to 25% by weight of acrylic acid or methacrylic acid, from 10 to 50% by weight of ethyl acrylate, n-butyl acrylate, 2-ethylhexyl acrylate or methyl methacrylate and from 30 to 70% by weight of styrene.

The acrylate resins (A) to be employed according to the invention are preferably manufactured by free-radical oligomerization at pressures of from 1.5 to 30 bars and temperatures of from 160° to 280° C., in substance, especially at temperatures of from 170° to 250° C., or in solution at from 160° to 250° C. The free-radical oligomerization is advantageously carried out in the absence of a regulator.

The oligomerization may, if desired, be carried out in the presence of free-radical initiators, such as peroxides and hydroperoxides, eg. di-t-butyl peroxide, t-butyl perbenzoate, butyl hydroperoxide, pinane hydroperoxide and cumene hydroperoxide, and of organic solvents, such as aromatic hydrocarbons, eg. Solvesso 100 from Esso (boiling range 155° to 178° C., aromatics content more than 95%), xylene, alcohols, eg. n-propanol and n-butanol, ethylene glycol monoalkyl ethers, eg. methylglycol, ethylglycol, butylglycol, alkyl glycol ether acetates, eg. methyl glycol acetate, ethyl glycol acetate and butyl glycol acetate, esters, eg. butyl acetate, and/or ketones, eg. methyl isobutyl ketone and methyl ethyl ketone.

The acrylate resins to be used according to the invention, with molecular weights $\overline{M}n$ of from 1500 to 3000 have, as 60% strength solutions in a 6:4 mixture of ®Solvesso 100 (aromatic hydrocarbon, boiling range 155° to 168° C., aromatics content more than 95%) and n-butanol, efflux times (beaker with a 6 mm orifice/23° C.) of from 15 to 150 seconds, preferably 20 to 90 seconds.

As stated above, the determination of the inhomogeneity (Mw/Mn) by gel permeation chromatography is effected by the method indicated in the Journal of Applied Polymer Science, vol. 19 (1975), pages 629 to 631, or described at the abovementioned seminars. Tetrahydrofuran is used as solvent, and crosslinked polystyrene gel (TSKG 3000 H8 and TSKG 4000 H8) as separation column. Measurement is carried out at 23° C. In each case, 0.2 ml of a 0.25% strength solution is injected. The flow rate is 0.8 ml/minute.

(B) Suitable epoxy resins with at least 2 oxirane groups per molecule are especially those having epoxide values of from about 0.2 to 0.7 mole of epoxide/100 g of material. Examples of suitable components (B) are reaction products of epichlorohydrin and bisphenol A, epichlorohydrin and polyalcohols, eg. trimethylolpropane or pentaerythritol, or epichlorohydrin and aliphatic, cycloaliphatic or aromatic polycarboxylic acids. However, low molecular weight acrylate resins with oxirane side groups, eg. glycidyl methacrylate homopolymers and copolymers, may also be used as epoxy resins (B).

The ratio of acrylate resin (A) to epoxy resin (B) may be varied within wide limits, but preferably the carboxyl/epoxide ratio is from 0.3:1 to 3:1.

(C) Component C is a mixture of from 20 to 80% by weight of a solvent having a boiling point of from 100° to 280° C. and a dielectric constant of from 2 to 4.99, and from 80 to 20% by weight of a solvent having a boiling point of from 80° to 200° C. and a dielectric constant of from 5 to 27.

The following are suitable solvents having a boiling point of from 100° to 280° C. and a dielectric constant of from 2 to 4.99:

Solvesso 100 (an aromatic hydrocarbon from Esso, containing more than 95% of aromatics), Solvesso 150 (an aromatic hydrocarbon from Esso, containing more than 95% of aromatics), Shellsol R (an aromatic hydrocarbon from Shell, containing more than 80% of aromatics), toluene and xylene, as well as mixtures of these solvents.

Examples of suitable solvents having a boiling point of from 80° to 200° C. and a dielectric constant of from 5 to 27 are n-propanol, i-propanol, n-butanol, i-butanol, pentanol, amyl alcohol, 2,2-dimethylpropanol, hexanol, 2-ethylhexanol, cyclohexanol, ethylene glycol monomethyl ether (methylglycol), ethylene glycol monoethyl ether (ethylglycol), ethylene glycol monobutyl ether (butylglycol), diethylene glycol monomethyl ether (methyldiglycol), diethylene glycol monoethyl ether (ethyldiglycol), diethylene glcyol monobutyl ether (butyldiglycol), propylene glycol monomethyl ether, ethylene glycol monoacetate, propylene glycol monoacetate, ethylene glycol monoethyl ether acetate, ethylene glycol monomethyl ether acetate, butyl acetate, diacetone-alcohol, 2-ethylmercaptoethanol, methyl isobutyl ketone and mixtures of these solvents.

Solvent mixtures of from 30 to 70% by weight of aromatic hydrocarbons, having a boiling range of from 150° to 270° C. and containing more than 80% by weight of aromatics, and from 70 to 30% by weight of alcohols which may or may not contain glycol monoalkyl ethers and/or glycol monoalkyl ether acetates are preferred.

Suitable pigments are the inorganic and organic pigments conventionally used in the surface coating industry, eg. titanium dioxide, inorganic and organic colored pigments, carbon black, talc, Aerosil and rust-protection pigments.

Preferably, the solvents already described are used to dilute the pigmented finishes to a spraying viscosity. However, it is also possible to use other conventional solvents for finishes, eg. aromatics, alcohols, esters and ketones.

The baking finishes, of low solvent content, of the invention can also, if desired, be crosslinked using conventional catalysts. Examples of suitable catalysts are tertiary amines, eg. 1,2-dimethylimidazole and 1-phenylimidizole, or quaternary ammonium salts, eg. tetrabutylammonium iodide.

In some cases it may be advantageous to add a surface coating binder conventionally used in the industry, in an amount of up to 20% by weight in order to modify specific properties in use, eg. resistance to chipping by stones.

The baking finishes of the invention may be used, for example, for the manufacture of finishes for domestic equipment, and of automotive primers.

It is a particular advantage that the finishes can be applied, in layers from 40 to 50 μm thick, to vertical surfaces, even in the absence of thixotropic agents, without sagging.

The parts and percentages in the text which follows, and in the Examples, are by weight.

MANUFACTURE OF ACRYLATE RESIN (A) I 1.5 parts of an aromatic hydrocarbon having a boiling range of from 155° to 178° C. and an aromatics content of more than 95% (eg. ®Solvesso 100 from Esso) are heated to 200° C. in a steel vessel heated with oil. The pressure in the vessel rises to about 1.6 bars. A monomer mixture of 1.575 parts of styrene, 1.313 parts of 2-ethylhexyl acrylate and 0.613 parts of acrylic acid, to which 0.070 part of di-t-peroxide has previously been added, is added under pressure to the boiling solvent in the course of 30 minutes. The pressure in the vessel rises to 7 bars. When all has been added, the resin is stirred under pressure at 200° C. for another 30 minutes, whereupon the vessel is cooled to 120° C. and vented and the resin is adjusted to a solids content of 60% with n-butanol.

Efflux time (beaker with 6 mm orifi 23° C.): 31 sec.
Acid number (solid resin): 135 mg of KOH/g
Mean molecular weight $\overline{M}n$ in toluene: 2300
Inhomogeneity (Mw/Mn) GPC: 1.78

MANUFACTURE OF ACRYLATE RESIN (A) II 60 parts of styrene, 25 parts of 2-ethylhexyl acrylate, 15 parts of acrylic acid and 2 parts of di-t-butyl peroxide are heated at 210° C. and 24 bars for 10 minutes in a continuously operated autoclave. The reaction mixture is then forced through a static mixer for after-polymerization (about 15 minutes at 200° C.). The unreacted monomers are subsequently distilled off at 230° C. and atmospheric pressure. The resin is dissolved in a solvent mixture consisting of 6 parts of Solvesso 100 and 4 parts of n-butanol to give a 60% strength solution.
Efflux time (beaker with 6 mm orifice/23° C.): 26 sec.
Acid number (solid resin): 113 mg of KOH/g
Mean molecular weight $\overline{M}n$ in toluene: 1800
Inhomogeneity (Mw/Mn) GPC: 1.86

EXAMPLE 1

124.0 parts of acrylate resin I (solids content=60%), 26.4 parts of an epoxy resin based on bisphenol A (epoxide value=0.54), 140.0 parts of $TiO_2$, 2.0 parts of tetrabutylammonium iodide (a 10% strength solution in a 1:1 mixture of n-butanol and xylene), 6.0 parts of n-butanol and 6.0 parts of xylene are thoroughly dispersed for 30 minutes in a vibratory ball mill, for example a Red Devil.

The mixture is then diluted to spraying viscosity (60 seconds, measured according to DIN 53,211) by means of about 15 parts of a 1:1 solvent mixture of butylglycol and xylene).

Solids content=76.1%

The finish is sprayed onto sheet steel and is baked for 30 minutes at 150° C.
Testing of the coating gives the following results:
Coating thickness: 64 μm
Gloss at 60° (DIN 67,530): 92
Pendulum hardness (DIN 53,157): 164 sec.
Erichsen value (DIN 53,156): 2.6 mm
Resistance to wash liquors: 8 cycles The resistance to wash liquors is determined by boiling a coated sheet for 8 hours in a 1% strength solution of a commercial detergent (eg. OMO) and leaving it to lie in the cold solution overnight. This test is repeated until recognizable changes in the coating, eg. a deterioration of the gloss, blistering or detachment from the sheet, are observable.

EXAMPLE 2

124.0 parts of acrylate resin II (solids content=60%), 26.4 parts of an epoxy resin based on bisphenol A (epoxide value=0.54), 140 parts of $TiO_2$, 2.0 parts of tetrabutylammonium iodide (a 10% strength solution in a 1:1 mixture of n-butanol and xylene), 6.0 parts of n-butanol and 6.0 parts of xylene are thoroughly dispersed in a vibratory ball mill, for example a Red Devil.

The mixture is then diluted to spraying viscosity (60 seconds, measured according to DIN 53,211) with about 15 parts of a 1:1 solvent mixture of butylglycol and xylene.

Solids content=78.5%.

The finish is sprayed onto sheet steel and is baked for 30 minutes at 150° C.
Testing of the coating gives the following results:
Coating thickness: 62 μm
Gloss at 60° C. (DIN 67,530): 96
Pendulum hardness (DIN 53,157): 144 sec.
Erichsen value (DIN 53,156): 8.8 mm
Resistance to wash liquors: 7 cycles.

We claim:

1. A baking finish of low solvent content comprising (A) an acrylate resin, (B) an epoxy resin, and (C) a mixture of organic solvents, with or without pigment, catalyst and other conventional auxiliaries, the acrylate resin (A) being a copolymer containing $\alpha,\beta$-olefinically unsaturated carboxylic acid copolymerized units having a K value (measured by the Fikentscher method) of less than 15 and an acid number of from 70 to 250 mg of KOH/g; the epoxy resin (B) containing at least 2 oxirane groups per molecule, and the organic solvent mixture (C) comprising from 20 to 80% by weight of a solvent having a boiling point of from 100° to 280° C. and a dielectric constant of from 2 to 4.99 and from 80 to 20% by weight of a solvent having a boiling point from 80° to 200° C. and a dielectric constant of from 5 to 27, the weight ratio of the components (A):(B) being from 9:1 to 6:4 and the weight ratio of the components (A+B):(C) being from 7:3 to 5:5, wherein the acrylate resin (A) has a mean molecular weight $\overline{M}n$ of from 1500 to 3000 and an inhomogeneity (Mw/Mn), measured by gel permeation chromatography of from 1.5 to 2.0, said acrylate resin (A) being a copolymer of from 12 to 25% by weight of acrylic acid or methacrylic acid, from 5 to 70% by weight of one or more esters of acrylic acid or methacrylic acid from the group consisting of ethyl acrylate, methyl methacrylate, ethyl methacrylate, butyl methacrylate, 2-ethylhexyl acrylate n-butyl acrylate, from 5 to 70% by weight of styrene and from 0 to 20% by weight of an alkanediol monoester of acrylic acid or methacrylic acid.

2. A baking finish as set forth in claim 1 wherein an acrylate resin (A) is used which has been manufactured from the monomers at temperatures of from 170° to 280° C. and pressures of from 1.5 to 30 bars in the presence or absence of a free-radical initiator and an organic solvent.

3. A baking finish as set forth in claim 1 wherein the solids content is more than 70% by weight.

4. A baking finish as set forth in claim 1 wherein the organic solvent mixture (C) is a mixture of from 30 to 70% by weight of an aromatic hydrocarbon mixture having a boiling range of from 150° to 270° C. and containing more than 80% by weight of aromatics with from 70 to 30% by weight of an alcohol mixture having a boiling point range of from 80° to 200° C., or a mixture of said alcohol mixture with at least one compound boiling at from 80° and 200° C. and selected from glycol monoalkyl ethers and glycol monoalkyl acetates.

5. A baking finish as set forth in claim 1 wherein the epoxy resin (B) has an epoxide value of from about 0.2 to 0.7 mole of epoxide/100 g of material.

6. A baking finish as set forth in claim 1 wherein the carboxyl/epoxide ratio of the acrylate resin (A) to the epoxy resin (B) is from 0.3:1 to 3:1.

7. A process of preparing a coated substrate, comprising:
spraying a baking finish according to claim 1 on said substrate to produce a coating on said substrate, and
baking said coated substrate to produce a coated substrate with a baked finish.

* * * * *